United States Patent [19]
Grycewicz

[11] Patent Number: 5,648,872
[45] Date of Patent: Jul. 15, 1997

[54] SINGLE LENS JOINT TRANSFORM CORRELATOR UTILIZING A FRESNEL ZONE PLATE SIGNAL

[75] Inventor: Thomas J. Grycewicz, Belmont, Mass.

[73] Assignee: The United States of America As Represented By The Secretary Of The Air Force, Washington, D.C.

[21] Appl. No.: 536,809

[22] Filed: Sep. 29, 1995

[51] Int. Cl.⁶ .............................. G02B 27/46; G06K 9/58
[52] U.S. Cl. ........................ 359/560; 359/561; 382/210
[58] Field of Search ................................ 359/561, 559, 359/560; 382/210, 211, 212; 364/822

[56] References Cited

U.S. PATENT DOCUMENTS

| | | | |
|---|---|---|---|
| 5,073,006 | 12/1991 | Horner et al. | 359/561 |
| 5,119,443 | 6/1992 | Javidi et al. | 359/561 |
| 5,367,579 | 11/1994 | Javidi et al. | 382/31 |

OTHER PUBLICATIONS

E. G. Lean et al, "Autocorrelation and Optical Hereodyne Detection", IBM Technical Disclosure Bulletin, vol. 11, No. 5, Oct., 1968, pp. 571–572.

H. Weinberger et al, "Interference Method for Pattern Comparison", Applied Optics, vol. 10, No. 11, Nov., 1971, pp. 2482–2487.

Primary Examiner—Jon W. Henry
Attorney, Agent, or Firm—Robert L. Nathans

[57] ABSTRACT

An amplitude encoded lens function signal, similar to a zone plate, is formed in the transform plane of a chirp encoded joint transform correlator. CCD correlation spot light sensor is separated from the transform plane by the focal length of the encoded lens function, and generates the desired output correlation spot. As a result, no prior art inverse transform lens need be provided, which simplifies the design. Further simplification is attainable in a low noise commercial image matching environment by eliminating the CCD correlation spot sensor entirely, and verifying an input image/reference image close match by using the eye of an operator to check for the presence of the visible zone plate, indicative of such a match.

12 Claims, 1 Drawing Sheet

SINGLE LENS JOINT TRANSFORM CORRELATOR UTILIZING A FRESNEL ZONE PLATE SIGNAL

STATEMENT OF GOVERNMENT INTEREST

The invention described herein may be manufactured and used by or for the Government for governmental purposes without the payment of any royalty thereon.

BACKGROUND OF THE INVENTION

The present invention relates to the field of Fourier transform optical correlators.

U.S. Pat. No. 5,367,579 issued to Bahram Javidi and Quing Tang, incorporated by reference herein, discloses a joint transform correlator (JTC) wherein the optical path length between the input image plane and a first Fourier transform lens differs from the optical path length between the reference image plane and the first transform lens, in contrast with conventional JTCs. This enables the second Fourier transform lens to separate the desired cross-correlation signals from the undesired auto-correlation signals, owing to the production of a chirp function as described in the patent, to thereby enhance the performance and reliability of the correlator.

It is deemed desirable to simplify the design of the patented Javidi chirp function JTC, to effect cost savings, particularly for use in pattern image recognition in the commercial sector.

BRIEF SUMMARY OF PREFERRED EMBODIMENTS OF THE INVENTION

In accordance with a first embodiment of the invention, the aforesaid second Fourier transform lens of the Javidi chirp function JTC has been eliminated, and an optical signal detector or CCD camera, is positioned in the focal plane of an amplitude encoded lens function, or Fresnel zone plate, produced in the transform plane of the correlator, due to the aforesaid chirp function. The recognition of the existence of this zone plate signal, which has a bulls-eye like pattern, in the transform plane of a chirp JTC, together with its use as if it were a physical lens, is an important aspect of the invention.

In accordance with a second embodiment of the invention, the output CCD camera can also be eliminated, and the Fresnel zone plate signal, produced in the transform plane, may be directly viewed by the human eye, and if present, indicates a substantial degree of correlation, and its location, between the input image and the reference image. This embodiment will work in a substantially noise free optical signal environment such as found in industrial establishments, wherein shapes of images of manufactured goods for example, are being compared to reference images. In contrast, the first embodiment would be employed for correlating noisy optical images such as input images retrieved in a battlefield environment.

BRIEF DESCRIPTION OF THE DRAWINGS

Other object's, features and advantages of the invention will become apparent upon study of the following description, taken in conjunction with the drawings in which.

DETAILED DESCRIPTION OF PREFERRED EMBODIMENTS OF THE INVENTION

Figure 1:
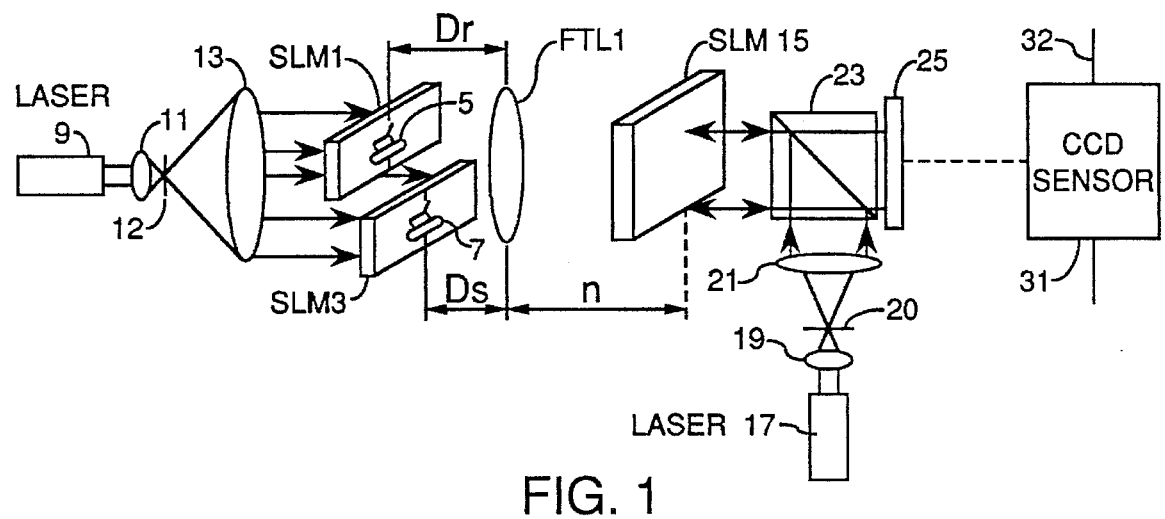
FIG. 1 illustrates the first embodiment of the invention, for correlating input images displaced from the optical (z) axis.

Referring now to FIG. 1, a joint image production mean comprises a first SLM 1 having a reference image 5 stored therein and a second SLM 3 having an input image 7 stored therein. While SLMs are preferred, generally speaking images or their binary versions or non-linearly transformed versions can be displayed not only on an SLM but also on photographic film or on any optical or opto-electronic input-output device. SLM 1 is in the reference plane that contains the reference signal $r(x+x\ y)$, or multiple reference signals, and is positioned a distance Dr from the transform lens FTL1 as indicated. SLM 3 is in the input plane that contains the input scene $s(x-x_o y)$ and is positioned a distance Ds from the transform lens. XO is a constant which is added to the position of one input image and subtracted from the position of the other input image. The result is an appropriate displacement of the joint JTC input images 5 and 7 with respect to each other and as shown in FIG. 1. The input scene, that may contain multiple targets, and the reference image or their binary versions or nonlinearly transformed versions can be displayed on transparencies or by the more practical SLMs. A coherent light beam is generated by laser 9 and illuminates both input SLMs with collimated light via lenses 11 and 13 and spatial filter 12. A Fourier transform lens means FTL 1 produces an interference pattern between Fourier transforms of the reference image 5 and the input image 7, which interference pattern is inputted into an image energy detector 15, which can be a square law detector such as an SLM or CCD camera or can comprise a liquid crystal light valve (LCLV). See W. P. Bleha et al, "Application of the liquid crystal light valve to real-time optical data processing", Opt. Eng., 17, 371–384 (1978). The output from LCLV 15 is a light pattern comprising a Fourier transform interference intensity signal which is called a joint power spectrum (JPS).

In the Javidi patent, the correlation signal is read out of the SLM (LCTV) 15 and is Fourier transformed by a second Fourier transform lens to form a correlation spot in an output plane including a CCD light sensor. In accordance with the present invention, this inverse transform lens is eliminated, to simplify the design, and a light sensor for detecting the correlation spot, typically a CCD camera 31, is positioned in the focal plane of the aforesaid encoded lens or zone plate having a bulls-eye like pattern, present in the transform plane of SLM 15. Hence, camera 31 functions as a correlation output detector means. The single lens joint transform correlator of the present invention allows this zone plate to self focus to the output plane 32 containing CCD output camera 31, which detects the resulting single sharp correlation peak. The large undesired auto correlation peak, which dominates the center of the prior chirp encoded binary JTC is absent, and thus the need for a minimum separation between the input and target images is eliminated. Thus, the output plane 32 of CCD camera 31 is positioned from the SLM 15 by the focal length of the zone plate which is set forth in equation 2 hereinbelow.

The reference and scene inputs $r(x,y)$ and $s(x,y)$, are distances $d_r$ and $d_x$ in front of the Fourier transform lens. They are displaced from the optical axis by distances $x_r$ and $x_s$. The joint power spectrum is formed in a plane one focal length behind the lens. If the Fourier transforms of $r(x,y)$ and $s(x,y)$ are $R(\alpha,\beta)$ and $S(\alpha,\beta)$, the chirp modulated joint power spectrum is given by:

$$I(\alpha,\beta) = |\Im\{r(x-x_r,y,d_r)\} + \Im\{s(x-x_s,y,d_s)\}|^2 = \left|R\left(\frac{\alpha}{\lambda f},\frac{\beta}{\lambda f}\right)\right|^2 + \left|S\left(\frac{\alpha}{\lambda f},\frac{\beta}{\lambda f}\right)\right|^2 + \quad (1)$$

$$2\left|R^*\left(\frac{\alpha}{\lambda f},\frac{\beta}{\lambda f}\right)S\left(\frac{\alpha}{\lambda f},\frac{\beta}{\lambda f}\right)\right|\cos\left\{\left(\frac{2\pi}{\lambda f}\right)\left[(x_r-x_s)\alpha + \frac{\Delta}{2f}(\alpha^2+\beta^2)\right]\right\}$$

where $\Delta = d_r - d_s$

The chirp factor is defined as $\Delta/f$. The effect of the chirp modulation is a quadratic factor in the cross product (R*S) term. In the JTC c=0, and the cross product is modulated by straight fringes formed by the cosine function. In the chirp modulated joint power spectrum, the fringes are curved and have a quadratic spatial period. This forms an amplitude encoded Fresnel zone plate centered at $[(X_s-x_r)f/\Delta, 0]$. The zone plate's focal length is f times the chirp factor, or $$d_f = f^2/\Delta \quad (2)$$

As in the JTC, the joint power spectrum is the input to the second stage. The SLJTC output is detected in the focal plane of the Fresnel zone plate. The output is the Fresnel diffraction pattern of the joint power spectrum in a plane d behind the Fourier plane.

$$o(x,y) = \frac{\Delta\lambda}{j4\pi f^2}\exp\left(\frac{j4\pi f^2}{\lambda}\right)\exp\left[\frac{j\pi c}{f}(x^2+y^2)\right]\iint I(\alpha,\beta)\exp\left\{\frac{j2\pi\Delta}{\lambda f^2}\left[\frac{1}{2}(\alpha^2-\beta^2)-(x\alpha+y\beta)\right]\right\}d\alpha d\beta \quad (3)$$

The terms in front of the integral are an amplitude scaling factor and a phase factor which is not relevant here since output intensity is detected. The integral can be expressed in terms of the inputs:

$$o(x,y) \propto \left[r\left(\frac{\Delta}{f}x,\frac{\Delta}{f}y\right)\star r\left(\frac{\Delta}{f}x,\frac{\Delta}{f}y\right) + s\left(\frac{\Delta}{f}x,\frac{\Delta}{f}y\right)\star s\left(\frac{\Delta}{f}x,\frac{\Delta}{f}y\right)\right]\otimes\left(\frac{j\Delta}{\lambda f^2}\right)\exp\left[\frac{-j\pi\Delta}{\lambda f^2}(x^2+y^2)\right] \quad (4)$$

$$+\left[r\left(\frac{\Delta}{f}x,\frac{\Delta}{f}y\right)\star s\left(\frac{\Delta}{f}x,\frac{\Delta}{f}y\right)\right]\otimes\delta\left[x-\frac{f}{\Delta}(x_s-x_r)\right]\otimes\left(\frac{j\Delta}{\lambda f^2}\right)\exp\left[\frac{-j\pi\Delta}{2\lambda f^2}(x^2+y^2)\right]$$

$$+\left[r\left(\frac{\Delta}{f}x,\frac{\Delta}{f}y\right)\star s\left(\frac{\Delta}{f}x,\frac{\Delta}{f}y\right)\right]\otimes\delta\left[x-\frac{f}{\Delta}(x_r-x_s)\right]$$

Here $\delta[\cdot]$ is the Dirac $\delta$ function, $\star$ denotes correlation, and $\otimes$ convolution. The first term in (4) is the Fresnel diffraction pattern of the reference and the scene power spectra. This autocorrelation term corresponds to the central peak in the JTC output. The peak is quite diffuse, particularly when the diffraction distance, $d_f$, is large. The second and third terms are formed by the cross spectrum. The second term is a noise term corresponding to the complementary peak seen in the JTC. This term can generally be ignored since in addition to being small, it is very diffuse. The third term is the output correlation peak. The output plane is magnified by $f/\Delta$, the recripocal of the chirp factor.

When a binary or non-linear SLM is used to form the Fresnel zone plate in the Fourier plane, the principal focus will be shown in equation 2. In addition, there will be a series of secondary foci at locations nearer to the SLM. The resolution achievable at these nearer foci is higher than at the principal focus, and a sharper correlation peak is possible. The resolution achievable in this way is better than that achievable using the binary joint transform correlator or the chirp encoded binary joint transform correlator. This advantage is somewhat offset since the amplitude at these nearer foci will have lower amplitude, resulting in a lower signal-to-noise ratio.

Thus, a new simplified, single lens JTC has been developed in accordance with the present invention. Like the chirp modulated JTC of the Javidi patent, only a single correlation peak is produced at a selected output correlation plane. Also, by varying the chirp factor ($\Delta/f$), the output correlation plane may be advantageously magnified. In the experimental setup, a chirp factor of 0.8 was used and a magnification of 1.25 was demonstrated. The autocorrelation peak was much more diffuse than the chirp modulated JTC, resulting in a 6.5 dB improvement in the output correlation peak signal-to-noise ratio, which was 17.1 dB.

Industrial environments can often be highly controlled so that little ambient optical noise is present, and thus the input signals can be relatively noise free. The input signals could represent, for example, metallic patterns formed upon an electronic chip under inspection during manufacture. Under these circumstances, a satisfactory degree of match of the input image with the reference image would produce the aforesaid zone plate or bulls-eye like pattern in the correlation plane. The absence of this pattern would indicate a mismatch. The presence of the bulls-eye pattern can be detected by the naked eye or through a simple eye-piece, so that output CCD sensor or camera 31 may be eliminated if desired, which in addition to the elimination of the second Fourier transform lens, further reduces costs for the inspection device.

Figure 2:
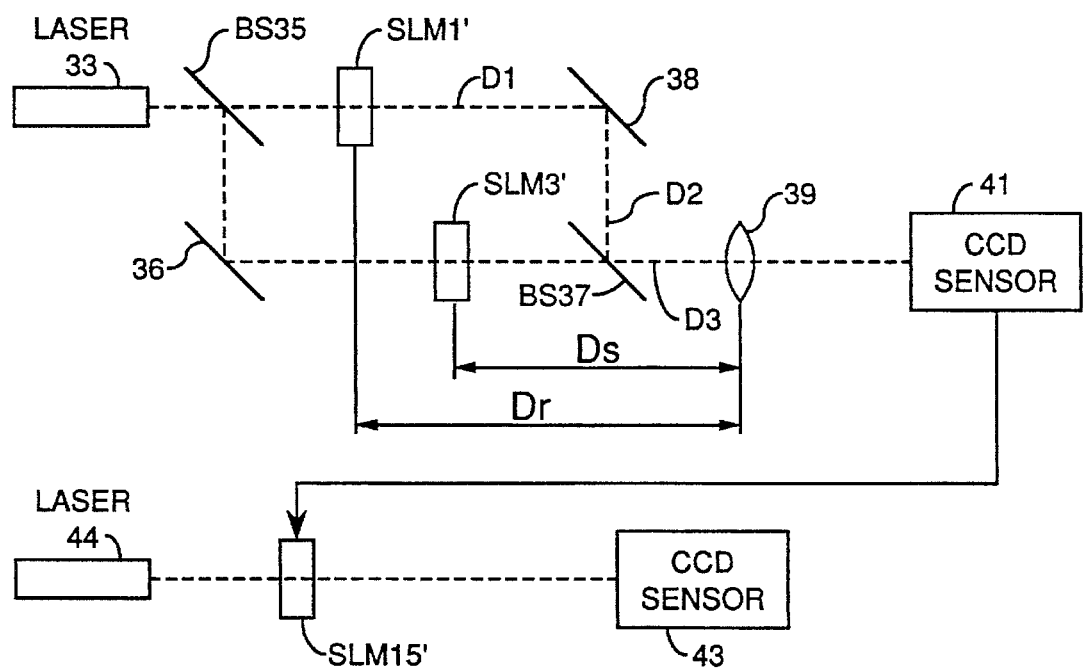
FIG. 2 illustrates another embodiment of the invention correlating two images which are colinear before being Fourier transformed.

While JTCs generally orient the input scene and reference images side-by-side or above and below the z optical axis, it is desirable for certain correlations that the two images being processed by the correlator are approximately colinear. This is desirable because it makes optimum use of the correlation signal's space bandwidth product. It relaxes the resolution requirements on the CCD detectors and SLMs used in the Fourier plane. Hence FIG. 2 is provided to show how the invention may be practiced to correlate such colinear images. Laser 33 illuminates both SLM 1' and SLM 3' via beamsplitter BS 35 and mirror 36. SLM 1' is coupled to transform lens 39 via mirror 38 and beamsplitter 37, and the optical path length between the transform lens and SLM 1' is Dr, as in FIG. 1, and the optical path length between SLM 3' and transform lens 39 is Ds, as in FIG. 1. Dr is the sum of the three segments D1, D2, and D3. The CCD 41 sensor is separated from transform lens 39 by the focal length of lens 39 as before. The output of CCD 41 is inputted into SLM 15, to replicate the two dimensional optical joint power spectrum detected by CCD 41. Output CCD sensor 43 is separated from the Fourier plane within SLM 15' by the focal length of the encoded lens or zone plate, as in the FIG. 1 embodiment. The power spectrum within SLM 15' is illuminated by laser 44 in the conventional manner. Hence, there is only one transform lens as in the FIG. 1 embodiment.

While there has been described what is at present considered to be the preferred embodiments of this invention, it will be obvious to those skilled in the art that various changes and modifications may be made therein without departing from the invention and it is, therefore, intended in the appended claims to cover all such changes and modifications as fall within the true spirit and scope of the invention, including art recognized equivalents.

What is claimed is:

1. A single lens joint transform correlator (JTC) comprising:
    (a) Fourier transform means for producing an interference pattern between Fourier transforms of a reference image and an input image in a transform plane;
    (b) joint image positioning means for positioning said reference image a first optical distance from said Fourier transform means and for positioning said input image a second optical distance from said Fourier transform means different from said first distance for producing a chirp encoded joint power spectrum at said transform plane which includes an encoded lens signal therein; and
    (c) correlation output detector means positioned in a focal plane of said encoded lens signal for producing a correlation signal indicative of the degree of match between said input image and said reference image, without the need for providing an inverse Fourier transform means.

2. The JTC of claim 1 wherein said encoded lens signal includes at least a portion of a bulls-eye pattern.

3. The JTC of claim 1 wherein said encoded lens signal includes at least a portion of a Fresnel zone plate.

4. The JTC of claim 2 wherein said encoded lens signal includes at least a portion of a Fresnel zone plate.

5. A single lens joint transform correlator (JTC) consisting essentially of:
    (a) Fourier transform means for producing an interference pattern between Fourier transforms of a reference image and an input image in a transform plane;
    (b) joint image positioning means for positioning said reference image a first optical distance from said Fourier transform means and for positioning said input image a second optical distance from said Fourier transform means different from said first distance for producing a chirp encoded joint power spectrum at said transform plane which includes an encoded lens signal therein; and
    (c) correlation output detector means positioned in a focal plane of said encoded lens signal for producing a correlation signal indicative of the degree of match between said input image and said reference image, without the need for providing an inverse Fourier transform means.

6. The JTC of claim 5 wherein said encoded lens signal includes at least a portion of a bulls-eye pattern.

7. The JTC of claim 5 wherein said encoded lens signal includes at least a portion of a Fresnel zone plate.

8. The JTC of claim 6 wherein said encoded lens signal includes at least a portion of a Fresnel zone plate.

9. A method of detecting a substantial degree of correlation between a reference image and an input image comprising the steps of:
    (a) providing a joint transform correlator (JTC) comprising:
        (a-1) Fourier transform means for producing an interference pattern between Fourier transforms of said reference image and said input image in a transform plane;
        (a-2) joint image positioning means for positioning said reference image a first optical distance from said Fourier transform means and for positioning said input image a second optical distance from said Fourier transform means different from said first distance for producing a chirp encoded joint power spectrum which includes an encoded lens signal therein; and
    (b) detecting the presence of said encoded lens signal at said transform plane which is indicative of a substantial degree of correlation between said input image and said reference image.

10. The method of claim 9 wherein step (b) is carried out by viewing said transform plane with the human eye.

11. A method of detecting a substantial degree of correlation between a reference image and an input image having little optical noise associated therewith comprising the steps of:
    (a) providing a single lens joint transform correlator (JTC) consisting essentially of Fourier transform means for producing an interference pattern between Fourier transforms of said reference image and said input image in a transform plane, together with joint image positioning means for positioning said reference image a first optical distance from said Fourier transform means and for positioning said input image a second optical distance from said Fourier transform means different from said first distance for producing a chirp encoded joint power spectrum which includes an encoded lens signal therein; and
    (b) detecting the presence of a bulls-eye like pattern at said transform plane which is indicative of a substantial degree of correlation between said input image and said reference image.

12. The method of claim 11 wherein step (b) is carried out by viewing said transform plane with the human eye.

* * * * *